US007166977B2

(12) United States Patent
Takayama et al.

(10) Patent No.: US 7,166,977 B2
(45) Date of Patent: Jan. 23, 2007

(54) INDURSTRIAL ROBOT CONTROLLING DEVICE

(75) Inventors: Shigenori Takayama, Kitakyushu (JP); Michiharu Tanaka, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 10/551,458

(22) PCT Filed: Mar. 18, 2004

(86) PCT No.: PCT/JP2004/003687

§ 371 (c)(1), (2), (4) Date: Sep. 30, 2005

(87) PCT Pub. No.: WO2004/089580

PCT Pub. Date: Oct. 21, 2004

(65) Prior Publication Data

US 2006/0192515 A1 Aug. 31, 2006

(30) Foreign Application Priority Data

Apr. 2, 2003 (JP) ............................ 2003-099569

(51) Int. Cl.
*B25J 19/06* (2006.01)
*H02P 3/04* (2006.01)

(52) U.S. Cl. ................................ 318/372; 318/568.11

(58) Field of Classification Search ................ 318/362, 318/364, 370–372, 563, 568.11
See application file for complete search history.

(56) References Cited

U.S. PATENT DOCUMENTS 5,497,057 A * 3/1996 Danielson et al. .......... 318/371
5,783,922 A * 7/1998 Hashimoto et al. .... 318/568.14
6,311,801 B1 * 11/2001 Takagi et al. ............... 187/290
6,498,448 B2 * 12/2002 Shimogama ................ 318/362

FOREIGN PATENT DOCUMENTS

| | | |
|---|---|---|
| JP | 3-92288 | 4/1991 |
| JP | 3-161295 | 7/1991 |
| JP | 6-50786 | 7/1994 |
| JP | 6-318108 | 11/1994 |
| JP | 8-126990 | 5/1996 |
| JP | 2000-296492 | 10/2000 |

* cited by examiner

*Primary Examiner*—Bentsu Ro
(74) *Attorney, Agent, or Firm*—Westerman, Hattori, Daniels & Adrian LLP

(57) ABSTRACT

Since a release voltage to a brake is applied by a plurality of series-connected contacts and at least one contact is a normally open contact of a relay for controlling a driving power supply of a motor, a control apparatus having a high safety characteristic for an industrial-purpose robot is provided, while even when fusion of a contact happens to occur, the control apparatus can firmly interrupt the application of the release voltage to the brake. Also, the control apparatus for the industrial-purpose robot is provided which need not be equipped with a power supply for releasing the brake by an operator in a manual manner.

To this end, in a control apparatus of an industrial-purpose robot (11) equipped with an electromagnetic type brake (23) which locks a shaft of a motor, the control apparatus is provided with a first relay contact (24) which is closed when the electromagnetic type brake (23) is released, and a second relay contact (22) which is closed when driving electric power is supplied to the motor; and the first relay contact (24), the second relay contact (22), and the electromagnetic type brake (23) are series-connected to a drive-purpose power supply (27) of the electromagnetic type brake (23).

4 Claims, 2 Drawing Sheets

24V 16 28 13 A TO MOTOR 0V 21 0V 22 23 24 27 23 24 23 24 B 17 25 C D 0V 26 19 18 24V 20

INDURSTRIAL ROBOT CONTROLLING DEVICE

TECHNICAL FIELD

The present invention relates to a control apparatus of an industrial-purpose robot equipped with an electromagnetic type brake which locks a shaft of a motor. More specifically, the present invention is directed to a control apparatus of an industrial-purpose robot, which releases the electromagnetic brake under such a condition that a driving power supply of the motor is cut out.

RELATED ART

A motor of an articulated industrial-purpose robot driven by an electro servo motor is controlled to be rotated at a predetermined speed, or to be stopped at a predetermined position in response to an instruction issued from a control apparatus in order that the robot may be located at the predetermined position, or may stand at a predetermined attitude. When the robot is intentionally stopped in response to an instruction of the above-explained control apparatus in connection with an interruption of the driving power supply of the motor, or when the robot is unintentionally stopped due to a certain abnormal event in connection with an interruption of the driving power supply of the motor, since the above-described driving-purpose power supply of the motor is cut out, the motor cannot maintain the predetermined position. Accordingly, an electromagnetic brake is provided on a motor shaft of the industrial-purpose robot. When the above-explained electromagnetic brake is energized, this electromagnetic brake releases constraint of the motor shaft, whereas when the electromagnetic brake is demagnetized, this electromagnetic brake locks the motor shaft. When the motor drive-purpose power supply is cut out, the above-explained electromagnetic brake locks the motor shaft in the above-explained manner (for instance, Japanese Laid-open Patent Application No. 2000-296492).

In the brake apparatus disclosed in Japanese Laid-open Patent Application No. 2000-296492, a brake releasing-purpose switch contact is closed so as to apply a power supply voltage to a coil of an electromagnetic brake which locks a motor shaft, so that locking of the motor shaft is released, while the power supply voltage is produced by rectifying an AC voltage in a half rectifying mode derived from an AC power supply. In other words, the brake is operated by opening/closing a single contact.

Also, in such a case that an abnormal event happens to occur while a robot is operated, and thus, the robot is stopped, there is such a problem that the robot cannot be repaired/adjusted while the robot is maintained at the stopped attitude thereof, otherwise a trouble may occur in operations of other production facilities. As a consequence, the attitude of the robot must be changed by releasing locking of a specific motor shaft. To this end, a robot control apparatus equipped with a brake releasing switch is proposed (for instance, Japanese Laid-open Patent Application No. Hei-8-126990).

Japanese Laid-open Patent Application No. Hei-8-126990 discloses such a robot control apparatus that while a releasing power supply for releasing a brake by being operated by an operator is provided in the robot control apparatus, both this releasing power supply and a main power supply are selectively connected to the brake by employing a main switch and an auxiliary switch.

However, in a brake circuit of the industrial-purpose robot described in Japanese Laid-open Patent Application No. 2000-296492, only one opening/closing contact of the brake circuit is employed. As a result, the following problem may occur. That is, if this open/close contact is fused, then the brake remains released, and thus, the attitude of the robot can be no longer held, so that a serious failure may be conducted. Namely, the robot may collide, or may interfere with a peripheral appliance, or the like.

Also, in the brake apparatus described in Japanese Laid-open Patent Application No. Hei-8-126990, the brake releasing-purpose power supply must be provided inside the robot control apparatus. As a result, there is another problem that the robot control apparatus can be hardly made compact, and also, the manufacturing cost thereof is increased.

DISCLOSURE OF THE INVENTION

The present invention is made to solve such problems, and therefore, has an object to provide a control apparatus having a high safety characteristic for an industrial-purpose robot, by which while a releasing voltage to a brake is applied by way of a plurality of series-connected contacts, even when fusing of the contacts happens to occur, the application of the releasing voltage to the brake can be firmly interrupted, and also, to provide a control apparatus for an industrial-purpose robot, which need not be equipped with a power supply for releasing the brake by being manually operated by an operator.

To solve the above-described problems, a control apparatus, according to the present invention, is featured by such a control apparatus of an industrial-purpose robot equipped with an electromagnetic type brake which locks a shaft of a motor, including:

a first relay contact which is closed when the electromagnetic type brake is released; and a second relay contact which is closed when driving electric power is supplied to the motor; wherein the first relay contact, the second relay contact, and the electromagnetic type brake are series-connected to a drive-purpose power supply of the electromagnetic type brake. Also, while a signal for closing the second relay contact is outputted, a signal for closing the first relay contact is outputted. Also, the control apparatus further includes:

a control unit for outputting a release signal of the electromagnetic type brake;

manual brake releasing input member for outputting a release signal of the electromagnetic type brake by being manually operated by an operator; and selecting member for selecting anyone of the release signal outputted from the control unit and the release signal outputted from the manual brake releasing input member so as to operate the first relay and the second relay. Also, the selecting member selects the output from the control unit when the driving power supply of the motor is turned ON, and selects the output from the manual brake releasing input member when the driving power supply of the motor is interrupted. Also, the manual brake releasing input member is provided on a hand held operating device. Further, the manual brake releasing input member corresponds to an external signal.

BEST MODE FOR CARRYING OUT THE INVENTION

Now, a description is made of a concrete embodiment of the present invention with reference to drawings.

Figure 1:
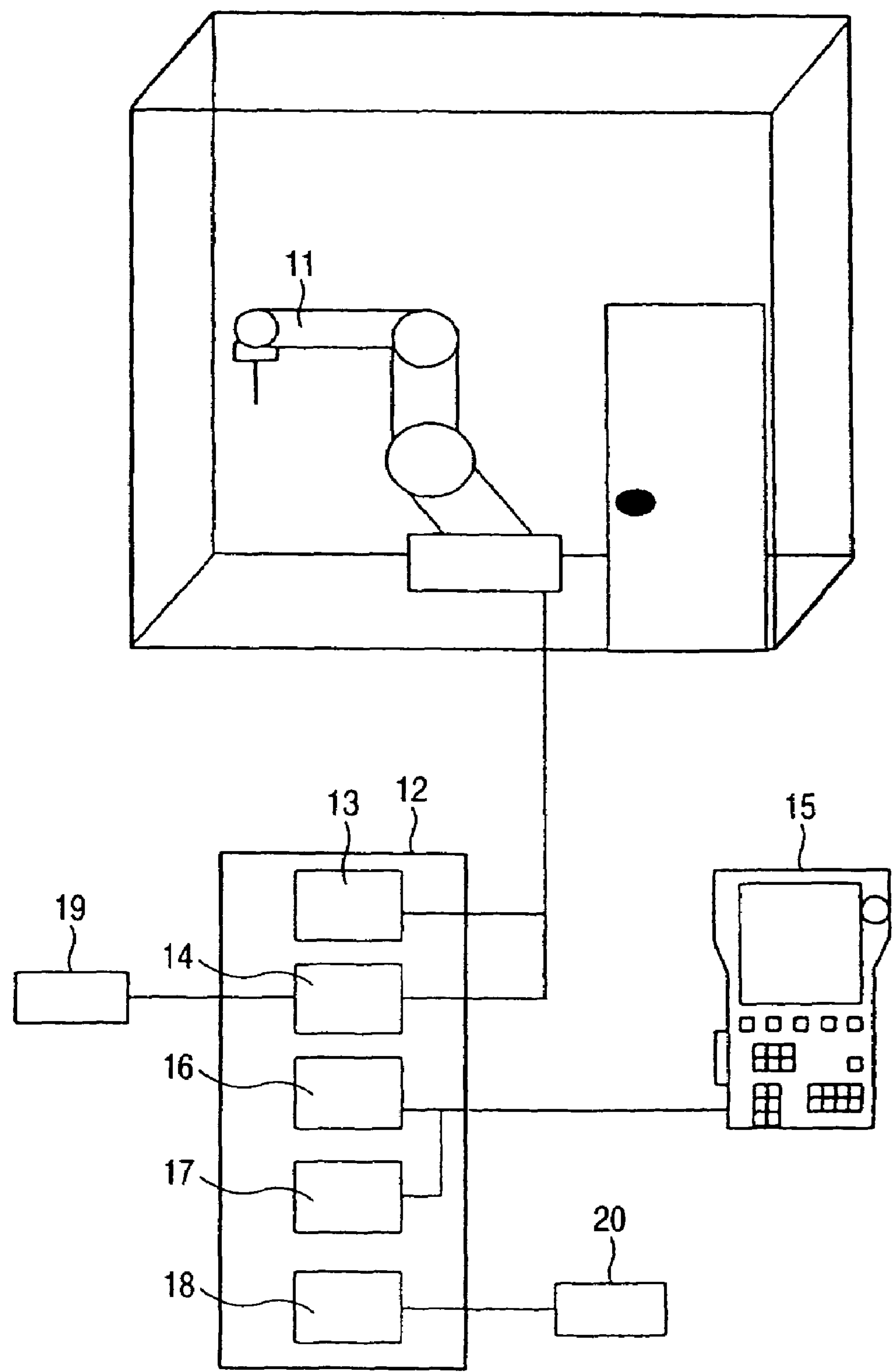
FIG. 1 is a structural diagram of a robot system which indicates an embodiment of the present invention.

FIG. 1 is a structural diagram of a robot system which indicates an embodiment of the present invention. In this drawing, reference numeral 11 shows a robot which should be controlled, and reference numeral 12 indicates a robot control apparatus for controlling the robot 11. The robot control apparatus 12 is provided with a drive apparatus 13, a brake control unit 14, a driving power supply pre-stage control appliance 16, a control unit 17, and an input/output unit 18. The drive apparatus 13 drives a motor (not shown) of the robot 11. The brake control unit 14 controls a brake of the above-explained motor. The driving power supply pre-stage control appliance 16 judges a turn-ON condition of the driving power supply in response to an emergency stop signal entered from an external unit, or a control signal entered from a pendant 15. The input/output unit 18 inputs and outputs an external signal. A brake releasing switch 19 is connected to the brake control unit 14, and a releasing switch 20 is also connected to the input/output unit 18.

In order to release the brake by an operation executed by an operator, there are one method for manipulating an operation key of the pendant 15, and another method for operating either the brake releasing switch 19 or the brake releasing switch 20 (will be explained later) . In such a case that either the brake releasing switch 19 or the brake releasing switch 20 is unnecessary, these switches 19 and 20 need not be connected. Also, in such a case that either the brake releasing switch 19 or the brake releasing switch 20 is required, these switches 19 and 20 may be alternatively connected.

The pendant 15 corresponds to a hand held operating device used to teach and operate the robot 11, while this pendant 15 is equipped with a plurality of operation keys, a display apparatus, and an enable apparatus. Depression information of the above-described operation keys is transferred to the control unit 17. The enable apparatus corresponds to a dead man switch which is employed so as to secure safety of the operator in a teaching operation. When the enable apparatus is gripped by the operator in the teaching mode, an enable condition is selected, the driving power supply of the motor is turned ON, and also, a drive signal is transferred form the driving apparatus 13 to the motor, so that the motor generates torque, brake releasing electric power is supplied from the brake control unit 14 to the brake so as to release this brake, and thus, the robot can be operated by manipulating the operation key of the pendant 15. When the operator releases gripping of the enable apparatus, the enable condition is released, so that the driving power supply to the motor is interrupted, and since the brake releasing power supply is cut out, the brake is operable.

Figure 2:
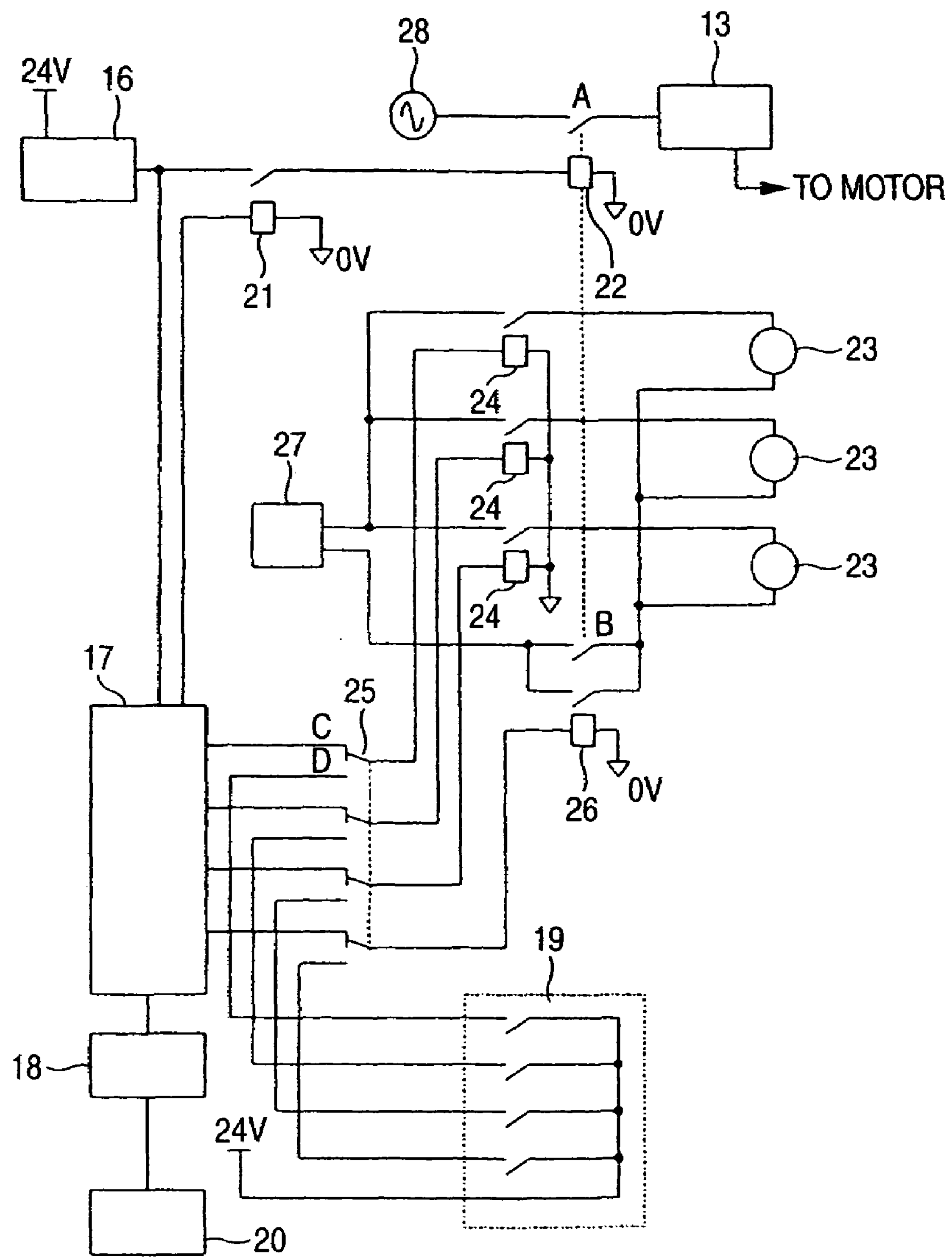
FIG. 2 is a structural diagram of a brake apparatus of the robot system which represents an embodiment of the present invention.

FIG. 2 is a structural diagram of a brake apparatus of the robot system which represents an embodiment of the present invention. A brake releasing operation is carried out in accordance with the below-mentioned sequence when either the normal teaching operation or a reproducing operation is carried out. Firstly, the control unit 17 confirms such a condition that the driving power supply turn-ON available condition (emergency stop is not operated etc.) of the motor based upon a signal derived from the driving power supply pre-stage control appliance 16, and closes a driving power supply control relay 21. When the driving power supply control relay 21 is closed, a driving power supply relay (electromagnetic contactor) 22 is energized, so that a contact "A" is closed so as to connect a power supply 28 to the drive apparatus 13, and also, a contact "B" is closed. Thereafter, drive currents are supplied from the drive apparatus 13 to the respective motors (not shown) in response to an instruction issued from the control unit 17, so that torque is generated in each of the motors. At this time, in an interlocking switch 25, while a contact "C" is selected, a break releasing signal flows from the control unit 17 via the interlocking switch 25 to a brake releasing relay 24, so that the brake releasing relay 24 is turned ON so as to close the contact thereof. When the brake releasing relay 24 is closed, a current flows from the brake power apparatus so as to release the brake 23. It should be noted that other motors are driven and brakes are released in similar sequential operations to the above-explained sequential operation.

A method for releasing the brake by entering the operation key of the pendant 15 (refer to FIG. 1) is carried out in accordance with the below-mentioned sequence. It should also be noted that in order to secure safety, the brake apparatus must be provided with a double hold-to-run function known as such a function by which the operator grips the enable apparatus when the brake is released (namely, such a function that enable apparatus is operated only when enable apparatus is manually operated, and operation of enable apparatus is stopped when operator releases enable apparatus).

First, since a predetermined key on the pendant 15 is operated, a brake releasing master relay 26 is closed. Concretely speaking, an energizing current flows from the control unit 17 via the contact "A" of the interlocking switch 25 to the brake releasing master relay 26 by operating the above-described key (it should be noted since robot 11 is under stopping operation when this key is manipulated, both contact "A" and contact "B" of driving power supply relay 22 are opened). Next, if a key for releasing a brake of a desirable shaft is manipulated, then an energizing current flows from the control unit 17 via the contact "A" of the interlocking switch 25 to the brake releasing relay 24 of the desirable shaft via the contact "A" of the interlocking switch 25, so that the brake releasing relay 24 is closed. As a result, since such a circuit is closed which is returned from a brake power supply apparatus 27 through the brake releasing relay 24, the brake 23, and the brake releasing master relay 26 to the brake power supply apparatus 27, a brake releasing current flows through the brake 23, so that the brake 23 may be released.

The sequential operation for releasing the brake by operating the brake releasing switch 20 is the same as the above-described method for releasing the brake by operating the pendant 15. In other words, if the operation for closing both the brake releasing master relay 26 and the brake releasing relay 24 is carried out by operating the brake releasing switch 20, then currents for closing (energizing) the respective relays are supplied from the control unit 17.

Next, a description is made of a sequential operation for releasing a brake by operating the brake releasing switch 19. The brake releasing operation by operating the brake releasing switch 19 is featured by that this brake releasing operation is carried out irrespective of the control operation by the control unit 17, namely, corresponds to a so-called "pure manual operation type brake releasing method."

First, the interlocking switch 25 is manipulated, so that the brake releasing circuit is connected to a contact "D". In other words, the brake releasing relay 24 is separated from the control unit 17, and then, is connected to the brake releasing switch 19. Next, the brake releasing switch 19 is manipulated so as to close the brake releasing master relay 26. Finally, a switch of the brake releasing switch 19 corresponding to a desirable shaft is manipulated, so that the brake releasing relay 24 of the above-described desirable shaft is closed so as to release the brake 23 of the desirable shaft.

It should also be understand that in the embodiment, the brake releasing switch 20 is realized as the mechanical switch. Alternatively, the brake releasing signal may be entered in response to an external signal, for example, an instruction issued from an upper order control apparatus.

As previously explained, in accordance with the present invention, since there are two pieces of the relays for opening and closing the brake, even when one relay of these two relays is fused, the brake power supply can be cut out by the other relay. As a consequence, there is such an advantage. That is, such a risk that the brake remains released due to fusion of the relay, and thus, the robot arm drops due to the gravity may be reduced, so that safety may be improved. Also, since both the brake power supply apparatus which is normally used, and the brake power supply which is used in the manual operation are commonly used, an exclusively designed power supply and/or an exclusively designed battery are no longer employed within the robot control apparatus. As a result, there is another effect that the robot control apparatus can be made compact.

INDUSTRIAL APPLICABILITY

The present invention is useful as the control apparatus for such an industrial-purpose robot equipped with the electromagnetic type brake which locks the shaft of the motor, more specifically, the present invention is useful as the control apparatus for such an industrial-purpose robot, which releases the electromagnetic brake under such a condition that the driving power supply of the motor is cut out.

The invention claimed is:

1. A control apparatus of an industrial-purpose robot equipped with an electromagnetic type brake which locks a shaft of a motor, comprising:

a first relay contact which is closed when the electromagnetic type brake is released;

a second relay contact which is closed when driving electric power is supplied to the motor, wherein the first relay contact, the second relay contact, and the electromagnetic type brake are series-connected to a drive-purpose power supply of the electromagnetic type brake;

a control unit for outputting a release signal of the electromagnetic type brake;

manual brake releasing input member for outputting a release signal of the electromagnetic type brake by being manually operated by an operator; and selecting member for selecting any one of the release signal outputted from the control unit and the release signal outputted from the manual brake releasing input member so as to operate the first relay and the second relay.

2. The control apparatus of an industrial-purpose robot as claimed in claim 1, wherein the selecting member selects the output from the control unit when the driving power supply of the motor is turned ON, and selects the output from the manual brake releasing input member when the driving power supply of the motor is interrupted.

3. The control apparatus of an industrial-purpose robot as claimed in claim 1, wherein the manual brake releasing input member is provided on a hand held operating device.

4. The control apparatus of an industrial-purpose robot as claimed in claim 1, wherein the manual brake releasing input member corresponds to an external signal.

* * * * *